US012756191B2

(12) United States Patent
Knox et al.

(10) Patent No.: US 12,756,191 B2
(45) Date of Patent: Oct. 6, 2026

(54) AC POWER SHARING SYSTEM

(71) Applicant: Allume Energy Pty Ltd, Richmond (AU)

(72) Inventors: Cameron Knox, Richmond (AU); Jorge Gonzalez, Richmond (AU); Tian Ting, Richmond (AU)

(73) Assignee: Allume Energy Pty Ltd, Richmond (AU)

( * ) Notice: Subject to any disclaimer, the term of this patent is extended or adjusted under 35 U.S.C. 154(b) by 382 days.

(21) Appl. No.: 17/045,813

(22) PCT Filed: Oct. 9, 2019

(86) PCT No.: PCT/AU2019/051091
§ 371 (c)(1),
(2) Date: Oct. 7, 2020

(87) PCT Pub. No.: WO2021/068023
PCT Pub. Date: Apr. 15, 2021

(65) Prior Publication Data
US 2023/0109175 A1 Apr. 6, 2023

(51) Int. Cl.
*H02J 3/00* (2026.01)
*H02B 1/24* (2006.01)
(Continued)

(52) U.S. Cl.
CPC .............. *H02J 3/007* (2020.01); *H02J 3/381* (2013.01); *H02J 2101/22* (2026.01)

(58) Field of Classification Search
CPC ........ H02J 3/007; H02J 3/381; H02J 2300/22; H02J 3/14; Y02B 70/3225; H02B 1/24
(Continued)

(56) References Cited

U.S. PATENT DOCUMENTS 5,473,528 A 12/1995 Hirata et al.
8,242,634 B2 8/2012 Schatz et al.
(Continued)

FOREIGN PATENT DOCUMENTS

EP 1263108 A1 12/2002
JP S59198879 A 11/1984
(Continued)

OTHER PUBLICATIONS

M.B Roberts et al., "Opportunities and barriers for photovoltaics on multi-unit residential buildings: Reviewing the Australian experience"; Renewable and Sustainable Energy Reviews 104 (2019) 95-110; Accepted on Dec. 9, 2018.
(Continued)

*Primary Examiner* — Rexford N Barnie
*Assistant Examiner* — Swarna N Chowdhuri
(74) *Attorney, Agent, or Firm* — Barclay Damon LLP

(57) ABSTRACT

An AC power sharing system for connecting an AC power source to at least two loads, the system comprising:

power distribution board, the power distribution board having at least one input for receiving AC power from the AC power source; and, the power distribution board further comprising at least two relays, each relay for connecting the distribution board to a load, each switch having an OPEN/CLOSED configuration, wherein in the CLOSED configuration the relay is configured to connect the AC power source to a load to provide power from the AC power source to the load;

wherein the relays comprise two IGBTs or MOSFETs arranged with their load side terminals connected in anti-series.

14 Claims, 7 Drawing Sheets

(51) Int. Cl.
*H02J 3/007* (2026.01)
*H02J 3/14* (2026.01)
*H02J 3/38* (2026.01)
*H02J 101/22* (2026.01)

(58) Field of Classification Search
USPC .......................................................... 307/11
See application file for complete search history.

(56) References Cited

U.S. PATENT DOCUMENTS 11,183,843 B1* 11/2021 Cooper .................... H02J 1/10
2002/0024828 A1 2/2002 Hayashi et al.
2002/0082747 A1 6/2002 Kramer
2002/0143438 A1 10/2002 Akiyama et al.
2005/0146824 A1* 7/2005 Borrego Bel ............ H02H 5/04 361/103
2008/0197630 A1* 8/2008 Wakitani ................ H02J 9/062 290/2
2009/0027932 A1 1/2009 Haines et al.
2013/0035802 A1 2/2013 Khaitan et al.
2014/0327316 A1 11/2014 Takahashi et al.
2014/0379156 A1 12/2014 Kamel et al.
2016/0006245 A1* 1/2016 Chow ...................... H02J 3/14 700/291
2016/0013646 A1 1/2016 Akerson
2016/0176305 A1* 6/2016 James .................... B60L 53/11 307/26
2017/0346292 A1* 11/2017 Handelsman .......... H02J 3/007
2019/0222058 A1 7/2019 Sharifipour
2019/0237995 A1 8/2019 Akita et al.
2020/0036190 A1 1/2020 Knox et al.

FOREIGN PATENT DOCUMENTS

JP 2003134672 A 5/2003
JP 2014082915 A 5/2014
KR 1020100130099 A 12/2010
WO 2012145715 A2 10/2012
WO 2013128422 A1 9/2013
WO 2013128588 A1 9/2013
WO WO 2018/184076 A1 10/2018

OTHER PUBLICATIONS

International Searching Authority/AU, Written Opinion of the International Searching Authority, Application No. PCT/US2019/028467, mailed Jan. 6, 2020, 4 pages.

* cited by examiner

AC POWER SHARING SYSTEM

This application is a 371 national phase entry of Patent Cooperation Treaty Application PCT/AU2019/051091, filed Oct. 9, 2019, which is incorporated herein by reference in its entirety.

FIELD

The present invention relates to an AC power sharing system.

BACKGROUND

As population density increases, apartment blocks are becoming increasingly prevalent. Currently in Australia, about 32% of new builds are apartments, of which about 73% are three stories or fewer, making these buildings highly eligible for solar power. However, there currently exists no delivery model that allows this section of the population to access solar power in an affordable way, whilst ensuring the solution is within the constraints of Australian energy regulations.

There are two main conventional methods for grid-connected solar systems. The first is an embedded network, which involves the installation of a 'parent meter' that acts as a gateway in front of all the existing meters to monitor the total power flow into the apartment block. The existing meters of all participating tenants must be replaced and converted to 'orphan meters'. The solar power supply can then be wired behind the parent meter and monitored by the orphan meters as they would retail electricity. The disadvantages of this approach in existing apartments are the high cost of replacing the meters and the large regulatory costs of dealing with the distributive network. Typically, at least 80% of the tenants in the building must join the network and they have no flexibility to opt out in the future. Additionally, for an embedded network to be installed in a new apartment build, there is a minimum threshold of energy throughput required to make the installation viable for the embedded network provider. The threshold currently corresponds to approximately 60 units but this number is growing as apartments are becoming more energy efficient.

The second conventional method involves wiring a separate small solar system to each tenant. The disadvantages of this approach are the complexity and associated costs of separate installations, and the inefficient usage of solar energy. That is, high daytime users may not have a large enough solar system to cover their consumption while neighbouring low daytime consumers may be inefficiently exporting their excess solar energy to the grid.

In this context, there is a need for improved behind-the-meter systems for distributing and controlling solar power in multi-unit buildings.

SUMMARY

In a first aspect the invention provides, an AC power sharing system for connecting an AC power source to at least two loads, the system comprising:

- power distribution board, the power distribution board having at least one input for receiving AC power from the AC power source; and,
- the power distribution board comprising at least two relays, each relay for connecting the AC power source to a load, each relay having an OPEN/CLOSED configuration, wherein in the CLOSED configuration the relay is configured to connect the AC power source to a load to provide power from the AC power source to the load;
- wherein the relays comprise two IGBTs or MOSFETs arranged with their load side terminals connected in anti-series.

In embodiments the at least two loads are arranged in parallel.

In embodiments the system provides even power sharing across all relays in a CLOSED configuration.

Further embodiments comprise a controller, the controller controlling the OPEN/CLOSED configuration of the relays.

In embodiments the controller receives measurements of power demand for the at least two loads from sensors, wherein the controller selectively controls the configuration of the relays in dependence on the power demand of the loads.

In embodiments the power distribution board is a distribution busbar.

In a second aspect the invention provides an AC power sharing system for use in a behind the meter system for controlled distribution of power from an embedded AC power source to at least two loads, where the loads are additionally connected to an electric power grid.

In embodiments the AC power source is a solar power coupled generating system including a grid tied inverter.

In a third aspect the invention provides a system for preventing flow of grid power between loads in a power sharing system comprising:

- power distribution board, the power distribution board comprising at least one input for receiving AC power from a first AC power source;
- the power distribution board further comprising at least two switches, each switch being configured to connect the first AC power source to a separate load in parallel, where each load is connected to an electric power grid in parallel and configured to receive grid power; wherein each switch has an OPEN/CLOSED configuration, wherein in the CLOSED configuration the switch is configured to connect the first AC power source to a load to provide power from the first AC power source to the load, and in the OPEN configuration the switch is configured to disconnect the first AC power source from the load;
- controller for selectively controlling the OPEN/CLOSED configuration of the switch;
- sensors configured to measure the power factor on connections between the power distribution board and the loads;
- wherein controller selectively changes the configuration of a switch from a CLOSED configuration to an OPEN configuration in dependence on the measured power factor on the connection between the power distribution board and the load being below a predefined threshold value, to disconnect the load from the first AC power source.

In embodiments the controller identifies the power factor periodically.

In a fourth aspect the invention provides a method for preventing flow of grid power between loads in a power sharing system comprising a power distribution board comprising at least one input for receiving AC power from a first AC power source;

- the power distribution board further comprising at least two switches, each switch being configured to connect the first AC power source to a separate load in parallel, each load being connected to an electric power grid in parallel and configured to receive grid power; wherein each switch has an OPEN/CLOSED configuration, wherein in the CLOSED configuration the switch is configured to connect the first AC power source to a load to provide power from the first AC power source to the load, and in the OPEN configuration the switch is configured to disconnect the first AC power source from the load;

controller for selectively controlling the OPEN/CLOSED configuration of the switches;

sensors configured to measure the power factor on the connections between the power distribution board and the loads:

the method comprising the steps of:

receiving at the controller power factor measurements from the sensors;

comparing the power factor measurements with a pre-defined threshold value; and selectively changing the configuration of a switch from a CLOSED configuration to an OPEN configuration in dependence on the measured power factor on the connection between the power distribution board and the load being below a pre-defined threshold value, to disconnect the load from the power distribution board.

In embodiments the controller compares the power factor periodically.

In embodiments the controller receives power factor measurements from the sensors continuously.

In embodiments the power factor measurements comprise measurements of AC current on the connection between the power distribution board and the load.

In a fifth aspect the invention provides system for preventing flow of grid power between loads in a power sharing system comprising:

power distribution board, the power distribution board comprising at least one input for receiving AC power from a first AC power source;

the power distribution board further comprising at least two switches, each switch being configured to connect the first AC power source to a separate load in parallel, where each load is connected to an electric power grid in parallel and configured to receive grid power; wherein each switch has an OPEN/CLOSED configuration, wherein in the CLOSED configuration the switch is configured to connect the first AC power source to a load to provide power from the first AC power source to the load, and in the OPEN configuration the switch is configured to disconnect the first AC power source from the load;

controller for selectively controlling the OPEN/CLOSED configuration of the switches;

sensors configured to measure the power demand of each load;

wherein controller receives power demand measurements from the sensors and compares the power demand of each load; and when the power demand of a first load is above a predefined multiple of the power demand of a second load, the controller selectively changes the configuration of the switch connecting the second load to the first AC power source from CLOSED to OPEN, to disconnect the load from the first AC power source.

In embodiments the controller compares the power demand of each load periodically.

In embodiments the controller receives power demand measurements continuously.

In a sixth aspect the invention provides a method for preventing flow of AC power between loads in a power sharing system comprising power distribution board, the power distribution board comprising at least one input for receiving AC power from a first AC power source;

the power distribution board further comprising at least two switches, each switch being configured to connect the first AC power source to a separate load in parallel, where each load is connected to an electric power grid in parallel and configured to receive grid power; wherein each switch has an OPEN/CLOSED configuration, wherein in the CLOSED configuration the switch is configured to connect the first AC power source to a load to provide power from the first AC power source to the load, and in the OPEN configuration the switch is configured to disconnect the first AC power source from the load;

controller for selectively controlling the OPEN/CLOSED configuration of the switches;

sensors configured to measure the power demand of each load:

comprising the steps of:

receiving at the controller power demand measurements from the sensors;

comparing the power demand of each load; and when the power demand of a first load is above a predefined multiple of the power demand of a second load, selectively changing the configuration of the switch connecting the second load to the first AC power source from CLOSED to OPEN, to disconnect the load from the first AC power source.

In embodiments the controller compares the power demand of each load periodically.

In embodiments the controller receives power demand measurements from the sensors continuously.

In a seventh aspect the invention provides a system for controlling distribution of AC power to parallel loads in a power sharing system comprising:

power distribution board, the power distribution board comprising at least one input for receiving AC power from a first AC power source;

the power distribution board further comprising at least two switches, each switch being configured to connect the first AC power source to a separate load in parallel, where each load is connected to an electric power grid in parallel and configured to receive grid power, wherein each switch has an OPEN/CLOSED configuration, wherein in the CLOSED configuration the switch is configured to connect the first AC power source to a load to provide power from the first AC power source to the load, and in the OPEN configuration the switch is configured to disconnect the first AC power source from the load;

controller for selectively controlling the OPEN/CLOSED configuration of the switches;

sensors configured to measure the total power from the first AC power source;

sensors configured to measure power demand of each load;

wherein the controller calculates power exported to the grid for different switch configurations and selectively controls switches to meet preferred power export requirements.

In an eighth aspect the invention provides a method for controlling distribution of AC power between loads in a power sharing system comprising power distribution board, the power distribution board comprising at least one input for receiving AC power from a first AC power source;

the power distribution board further comprising at least two switches, each switch being configured to connect the first AC power source to a separate load in parallel, where each load is connected to an electric power grid in parallel and configured to receive grid power, wherein each switch has an OPEN/CLOSED configuration, wherein in the CLOSED configuration the switch is configured to connect the first AC power source to a load to provide power from the first AC power source to the load, and in the OPEN configuration the switch is configured to disconnect the first AC power source from the load;

controller for selectively controlling the OPEN/CLOSED configuration of the switches;

sensors configured to measure the total power from the first AC power source;

sensors configured to measure power demand of each load;

comprising the steps of:

receiving at the controller measurements from the sensors;

calculating power exported to the grid for different switch configurations;

determining preferred power export requirements identifying a switch configuration which best matches the preferred power export requirements; and selectively setting the configuration of the switches in accordance with the best match to the preferred export requirements.

In a ninth aspect the invention provides a behind-the-meter system for controlled distribution of solar power to units in a multi-unit building connected to an electric power grid, the system comprising:

a grid-tied inverter connectable between a solar power generator and the electric power grid;

sensors configured to measure instantaneously:

power demand and solar power consumption of the units; and solar power generation by the solar power generator;

switches configured to selectively connect and disconnect the units from the solar power generator; and at least one controller connected to the sensors and the switches, wherein the at least one controller is configured to:

determine relative values of power demand and solar power consumption of the units based on the instantaneous measurements of the power demand and the solar power consumption of the units; and selectively and individually control the switches to distribute solar power from the solar power generator between the units based on the relative values of the instantaneous power demand and the solar power consumption of the units to maximise solar power consumption by the units.

An advantage of embodiments of the invention is that solar power is distributed on an on-demand basis to optimise on-site solar consumption and minimising the amount of solar generated power returned to the grid. The dynamic and adaptive nature of the distribution system can allow for the sharing of solar for other intended outcomes. For example even solar allocation, peak shaving or time-of-use optimising for the units connected The at least one controller may be further configured to:

pre-emptively identify cross flow of solar power between the units based on:

the relative values of the power demand and the solar power consumption of the units; and the instantaneous measurements of the solar power generation by the solar power generator; and selectively and individually control the switches to isolate the units from the solar power generator based on the pre-emptive cross flow identification to prevent the cross flow of solar power between the units.

The solar power generator may comprise a solar photovoltaic array.

The switches may comprise relays.

The switches may comprise solid-state relays (SSRs).

The sensors may comprise power measurement integrated circuits (ICs) connected to power supply lines of the units by current transformer (CT) clamps.

The at least one controller, SSRs and power management ICs may be provided on one or more printed circuit boards (PCB).

The at least one controller may comprise a main microcontroller and sub-microcontrollers, wherein the main microcontroller is connected to power management ICs and SSRs in a main distribution control module, and the sub-microcontrollers are connected to power management ICs in detached metering modules located in a main switchboard of the multi-unit building.

The detached metering modules may be wired and/or wirelessly connected to the main distribution control module.

In a tenth aspect the invention provides a behind-the-meter method for controlled distribution of solar power to units in a multi-unit building connected to an electric power grid, the method comprising:

connecting a grid-tied inverter between a solar power generator and the electric power grid;

providing sensors configured to measure instantaneously:

power demand and solar power consumption of the units; and solar power generation by the solar power generator;

providing switches configured to selectively connect and disconnect the units from the solar power generator; and determining relative values of power demand and solar power consumption of the units based on the instantaneous measurements of the power demand and the solar power consumption of the units;

selectively and individually controlling the switches to distribute solar power from the solar power generator between the units based on the relative values of the power demand and the solar power consumption of the units to maximise solar power consumption by the units.

The method may further comprise:

pre-emptively identifying cross flow of solar power between the units based on:

the relative values of the power demand and the solar power consumption of the units; and the instantaneous measurements of the solar power generation by the solar power generator;

selectively and individually controlling the switches to isolate the units from the solar power generator based on the pre-emptive identification to prevent the cross flow of solar power between the units.

The present invention also provides a multi-unit building comprising the system described above or using the method described above.

In an eleventh aspect the invention provides a behind-the-meter system for controlled distribution of AC power from a first power source to a plurality of loads, each load being connected to an electric power grid, the system comprising: sensors configured to measure instantaneously: power demand of the load; consumption of power from the first AC power source by the load; and AC power from the first power source; switches configured to selectively connect and disconnect the load from first power source; and at least one controller connected to the sensors and the switches, wherein the at least one controller is configured to: determine relative values of power demand and consumption of power from the first AC power source of the loads based on the instantaneous measurements of the power demand and the consumption of power from the first AC power source by the load; and selectively and individually control the switches to distribute AC power from the first AC power source between the loads based on the relative values of the power demand and consumption of power from the first AC power source by the load to maximise consumption of power from the first power source by the loads.

In embodiments the at least one controller is further configured to:

pre-emptively identify cross flow of power from the first power source between loads, based on:

the relative values of the power demand and consumption of power from the first AC power source by the loads; and the instantaneous measurements of total power provided by the first power source; and selectively and individually control the switches to isolate the loads from the first power source based on the pre-emptive cross flow identification to prevent the cross flow of power from the first power source between the loads.

In embodiments the first power source comprises a solar power generator comprises a solar photovoltaic array.

In embodiments the first power source comprises a wind power generator.

In embodiments the first AC power source is an embedded power source configured to be higher voltage than grid power.

In embodiments the switches are relays.

In embodiments the switches are solid state relays (SSR).

In embodiments the switches comprise wherein two IGBTs or MOSFETs arranged with their load side terminals connected in anti-series.

BRIEF DESCRIPTION OF DRAWINGS

Embodiments of the invention will now be described by way of example only with reference to the accompanying drawings, in which.

DESCRIPTION OF EMBODIMENTS

Figure 1:
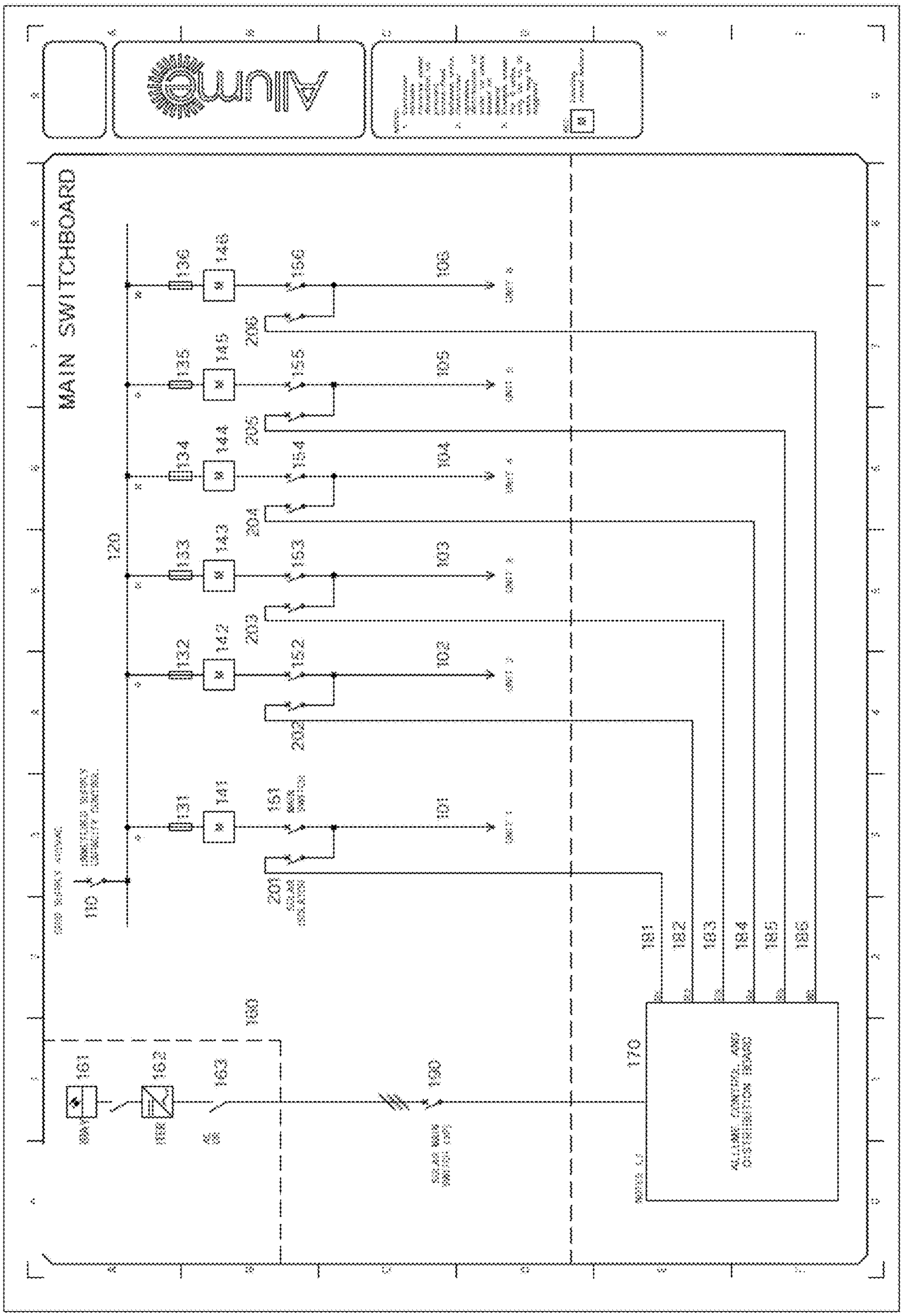
FIG. 1 is an example circuit diagram of a behind-the-meter system for controlled distribution of solar power according to an example embodiment of the present invention.
Figure 2:
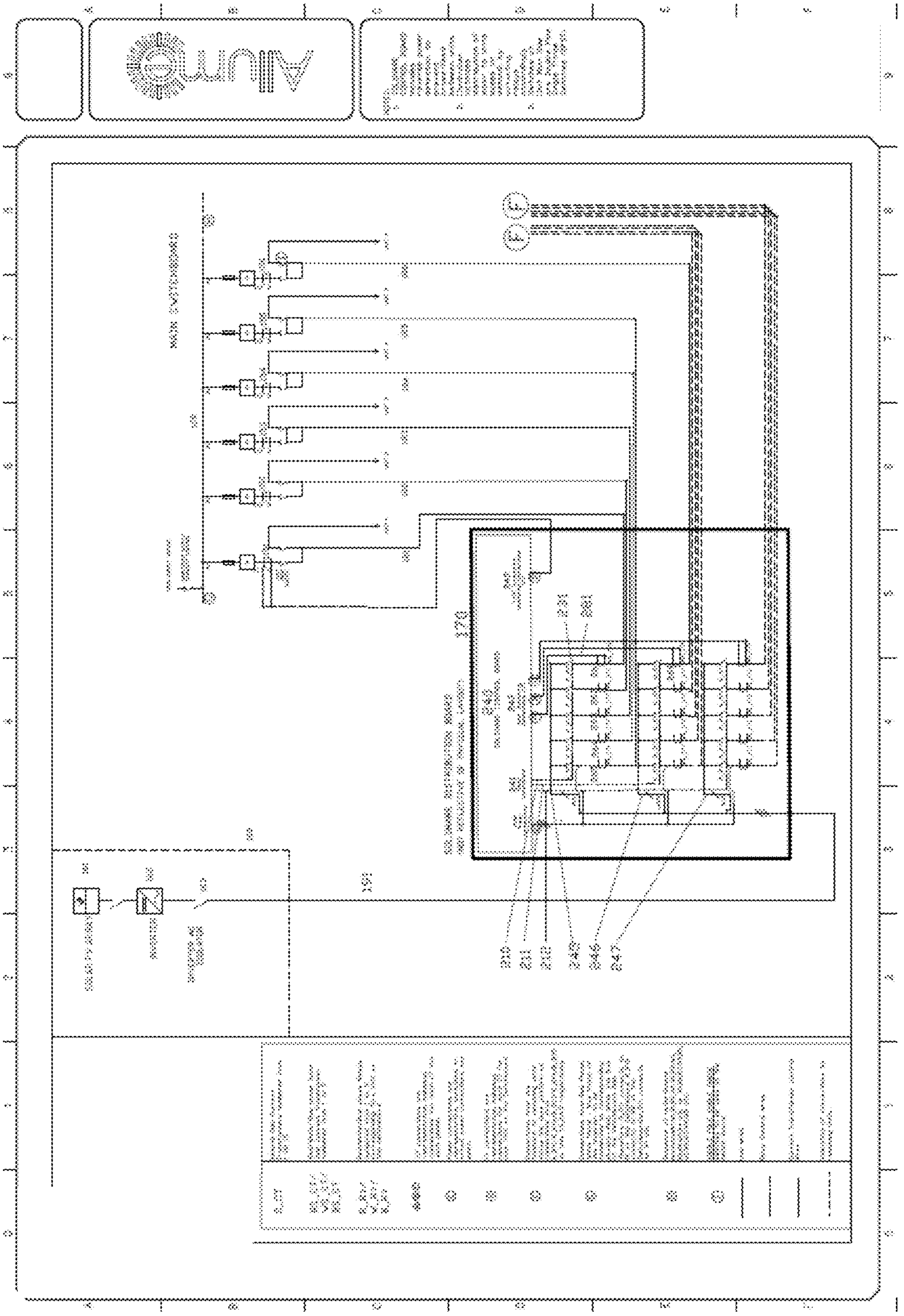
FIG. 2 is a further example of a circuit diagram of a behind-the-meter system for controlled distribution of solar power

FIGS. 1 and 2 illustrate an example embodiment of a behind-the-meter system for controlled distribution of solar power to units in a multi-unit building (not shown) connected to an electric power grid. The system may comprise a grid-tied inverter connectable between a solar power generator and the electric power grid. The solar power generator may, for example, comprise a solar photovoltaic array. Each unit may comprise a circuit that is directly connected to the electric power grid, and may be metered by its own retail electricity meter, for example, an apartment, retail store, office, etc.

The system may comprise sensors configured to measure instantaneously power demand (ie, total power demand per unit) and solar power consumption (ie, solar power delivered to each unit) of the units, and solar power generation by the solar power generator. The sensors may, for example, comprise power measurement ICs connected to power supply lines of the units by CT clamps. Alternatively, shunt resistors or Rogowski coils may be used instead of CTs for current sensing.

The use of non-intrusive CT clamps requires CTs to be installed at the distribution board, as well as the main switchboard and be wired back into the solar power distribution control board of the system. Detached modules may be used to communicate data from the CTs to the control board via a serial cable or wireless communication protocol, meaning the physical wiring of individual CTs from the main switchboard to the distribution board may not be required.

The system may further comprise switches configured to selectively connect and disconnect the units from the solar power generator. The switches may, for example, comprise SSRs.

At least one controller may be connected to the sensors and the switches. The at least one controller, SSRs and power management ICs may be provided on one or more PCBs. The at least one controller may be configured to determine relative or proportional values of power demand and solar power consumption of the units based on the instantaneous measurements of the power demand and the solar power consumption of the units 1-6.

The system of FIGS. 1 and 2 is now discussed in greater detail. Consistent numbering is used for equivalent components within FIGS. 1 and 2. FIGS. 1 and 2 show the infrastructure for delivering power to multiple units (Unit 1 Unit 2 Unit 3 Unit 4 Unit 5 Unit 6). Typically, the units are positioned in a single building. Power is delivered to the units via power supply lines 101 102 103 104 105 106. Power supply lines 101 102 103 104 105 106 are connected to an electric power grid 110 and form part of the grid power delivery circuit to the units. In the example of FIGS. 1 and 2, each of the power supply lines is connected to main switchboard 120. Each power supply line 101 102 103 104 105 106 includes a fuse, or meter isolator, 131 132 133 134 135 136, electricity meter 141 142 143 144 145 146 and grid isolator switch 151 152 153 154 155 156. In FIGS. 1 and 2 grid switches 151 152 153 154 155 156 are open. In these open configurations grid supply 110 is disconnected from units and no grid power is delivered to the units. Typically, these switches are standard circuit breakers that form part of the standard electrical infrastructure of the building. Generally, these switches can only be switched open or closed manually by an electrician or are tripped during a short-circuit or overcurrent event. The unit power supply lines, grid supply, fuses, electricity meter and grid switches described above are typically installed as part of the basic electrical circuitry for the units.

In the examples of FIGS. 1 and 2, grid power is delivered in three phases, Red White and Blue. Each unit shown in the Figures is connected to a single phase only. Unit 1, Unit 2, Unit 3, Unit 4, Unit 5 are connected to Red phase power. Unit 6 is connected to White phase power. In further examples, units may be connected to multiple phases. Typically, units having greater power requirements may be connected to multiple phases. The examples of FIGS. 1 and 2 only show the electrical connections to six units in detail.

Units 1 2 3 4 5 6 can also be selectively connected to solar power generator 160. Solar power generator 160 includes a solar PV array 161, solar inverter 162 and inverter AC isolator 163. Solar inverter 162 is set to provide power at a higher voltage compared with grid voltage, but within operational voltages of appliances. For example, in Australia, solar inverter may be set to provide power in the range of 235V to 240V compared with grid power being provided in the range of 230V to 235V.

Embodiments of the behind the meter control system are positioned between solar power generator 160 and Units 1 to 6 to selectively provide solar power from solar power generator 160 to Units 1 to 6.

The power output from solar power generator 160 is connected into control system 170, shown in detail in FIG. 2. The power circuit 191 between solar power generator 160 and control system 170 includes isolation switch 190.

Control system 170 includes controller 240 and power distribution boards 245 246 247 to selectively provide solar power to solar power supply lines 181 182 183 184 185 186. Each solar power supply line is connected to a specific unit. For example, power supply line 181 is connected to UNIT 1, power supply line 182 is connected to UNIT 2, power supply line 183 is connected to UNIT 4, power supply line 184 is connected to UNIT 4, power supply line 185 is connected to UNIT 5, power supply line 186 is connected to UNIT 6. Control system delivers power onto each power supply line at the same phase as the grid power associated with relevant unit. In the example of FIG. 1: control system 170 provides solar power onto power supply line 181, 182, 183, 184, 185 on Red phase, since Units 1, 2, 3, 4, 5 are operating on Red phase grid power; control system 170 provides solar power onto supply line 186 on White phase, since UNIT 6 is operating on White grid power; etc.

Additional units may be connected to control system 170, for example each of distribution boards 245 246 247 may be connected to multiple units. In FIGS. 1 and 2, five units are connected to distribution board 245. In further examples, five units may be connected to each of distribution boards 245 246 247. If yet further examples, less than five or more than five units may be connected to each distribution board.

Typically, when multiple power phases are provided, at least one unit must be connected to each phase, i.e. distribution boards 245 246 247 must have at least 1 unit connected to each.

Each solar power supply line is connected onto the power supply line of the relevant unit on the load side of the grid switch for that unit. For example, solar power supply line 181 is connected to power supply line 101 for Unit 1 on the load side of grid switch 151.

Each of the solar power supply lines includes a solar isolator switch 201 202 203 204 205 206. Solar isolators are placed between the control system output and a point of common coupling at the switchboard for every unit. In the illustrations of FIGS. 1 and 2 solar isolator switches are open. In the open configuration the control system 170 is isolated from the units and no solar power is delivered to the units with the solar isolator switches in the open configuration. Typically, the solar isolators are circuit breakers (MCBs) and used for manual isolation if an electrician needs to perform works on the control system 170 or on the unit's circuit.

Control system 170 is shown in more detail in FIG. 2. Power circuit 191 carries solar generated power from Solar Generator 160 to control system 170. The Red, White Blue phase outputs from solar inverter 162 are connected onto solar distribution boards 245 (Red phase), 246 (White phase), 247 (Blue phase) within control system 170. The connections from solar distribution board 245 to units 1 to 5 are shown in detail along with a connection from solar distribution board 246 (White phase) to unit 6.

Solar power supply lines 181 182 183 184 185 are connected onto solar distribution board 245 via switchboard 210.

Switchboard 210 includes switches 231 232 233 234 235. In preferred embodiments the switches are electrical relays.

Each relay connects one of solar power supply lines 181 182 183 184 185 to solar distribution board 245. In the circuit diagram of FIG. 2 each solar relay is in an open configuration. The units are isolated from the solar distribution board, and hence the solar power supply, when the relay is in the open configuration to prevent any power delivery from solar power supply to the solar power supply lines. In the closed configuration, a unit is connected to the solar power source. The open/closed configuration of the solar relays is controlled by control system 170.

Control system 170 provides controlled delivery of solar power from solar power generator 160 to each unit. Control of the open/closed configuration of solar relays 231 232 233 234 235 236 in combination with the open closed configuration of isolation switch 190 and the open/closed configuration of solar isolators 201 202 203 204 205 206 determine which units receive solar power at any time.

The configuration of the relays and switches in the circuit is determined and controlled by control board 240. Control board 240 includes relay controllers 241 to control configuration of relays.

Depending on the configuration of switches, a particular unit may be receiving grid power only, or a combination of grid power and solar power. The system is configured to prevent solar power flowing to a unit if it loses its grid connection. This configuration is discussed in more detail below.

In a situation when the switches for a particular unit are closed and the unit receives solar power and grid power, the unit will consume the higher power source first. Since the solar power is delivered at a higher voltage, solar power will always be consumed in preference to grid power.

Sensors (illustrated in FIG. 2) are arranged within the system and configured to measure solar power consumption and grid power consumption by units. The sensors may, for example, comprise power measurement ICs connected to power supply lines of the units by CT clamps. Alternatively, shunt resistors or Rogowski coils may be used instead of CTs for current sensing.

As discussed above, grid consumption CTs 251 252 253 254 255 256 are installed at the main switchboard. These sensors measure power consumption from the grid for each unit. As shown in FIG. 2, grid consumption CT 251 measures grid power consumption for UNIT 1, grid consumption CT 252 measures grid power consumption for UNIT 2, and so on. Grid consumption CTs are connected to control board 240 at 241.

In the embodiment of FIG. 2, solar power consumption by each unit is measured on the solar power supply lines at the control system. Sensors 261 262 263 264 265 266 measure solar power consumption for each unit. As shown in FIG. 2, solar consumption sensor 261 measures solar consumption for UNIT 1, solar consumption sensor 262 measures solar consumption for UNIT 2, and so on. The sensors may be non-intrusive CT clamps or other sensors.

Each sensor communicates with control board 240. Sensors may communicate data with the control board via a cable or wireless communication protocol, meaning the physical wiring of individual CTs from the main switchboard to the distribution board is not required. In FIG. 2, the data connections between the sensors and control board 240 are shown as 271 to 276 and 281 (data connections 282 to 286 for sensors 262 to 266 are not illustrated in FIG. 2).

Control board 240 can be configured to select the configuration of the various relays and switches to control distribution of solar power to units. The configuration at any time or circumstances may be based on different factors, electrical conditions or measurements. Some examples of switching algorithms are described below.

Figure 3:
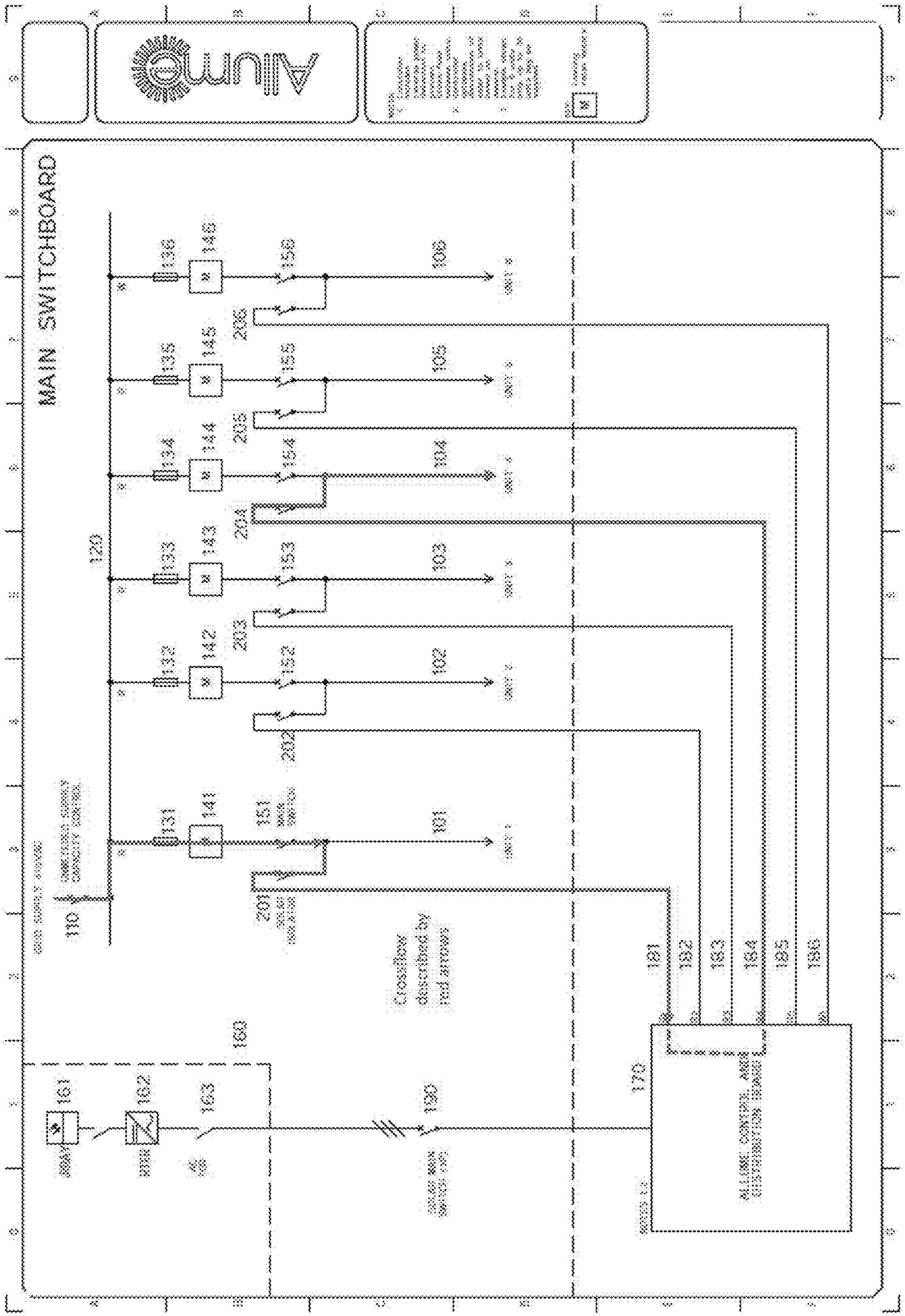
FIG. 3 is an example circuit diagram showing cross flow of grid power.
Figure 4:
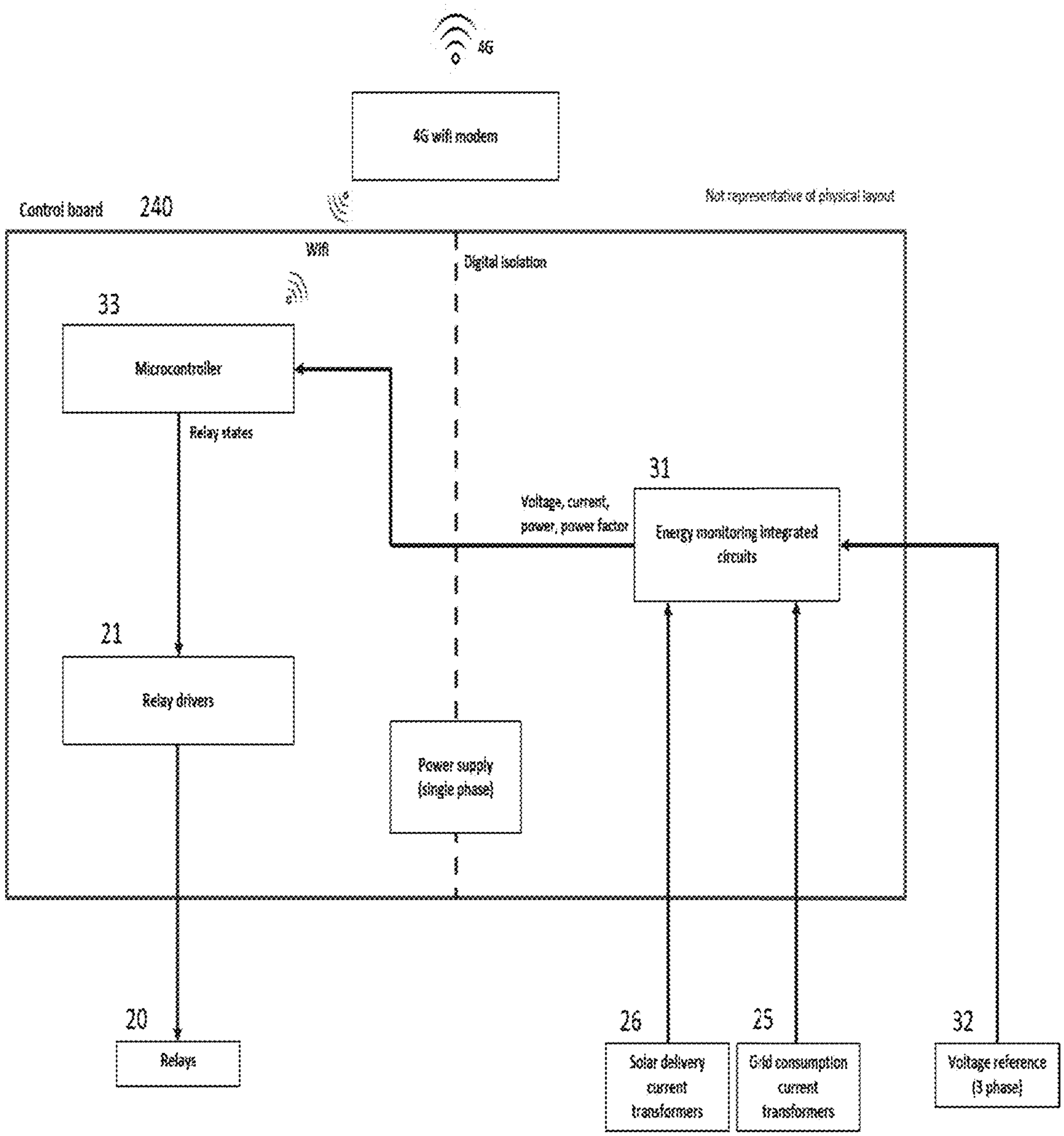
FIG. 4 is an exemplary embodiment of the control system.

A further representation of control board 240 is shown in FIG. 4. In a three phase system, as described above, control board 24 controls the relays for all three phases. Input signals from solar power CTs 26 and grid consumption CTs 25 are received at the energy monitoring ICs 31 along with the voltage reference 32. In the example of FIG. 3 the energy monitoring ICs are positioned on the central control board 24 in the control system and receive signals from the CT sensors 26 27 positioned remotely from the control board. In further embodiments the energy monitoring ICs 31 may be positioned locally with the sensors and physically remote from the central control board. Energy monitoring ICs 31 are connected to microcontroller 33 and transmit measurements and calculated values based on the data received from the sensors, including voltage, current, power, power factor. Further information, including unit identification is transmitted with the measurements and calculated values.

Microcontroller 33 controls the states of relays 20. Microcontroller is connected to relay drivers 21 and provides control instructions to relay drivers 21. Relay drivers control relays 20.

The embodiment shown in FIG. 3 is for illustration purposes only. In different embodiments the specific components may be physically positioned on a single PCB or multiple detached PCBs. The sensors and energy monitoring ICs and microcontroller may communicate across wired connections or may communicate across wireless connections, for example across a 4G wifi network or other wireless communication network.

Cross flow is a condition in which power from the grid travels from one unit to another. Cross-flow is power flow from a unit's point of grid connection through the distribution board and into another unit's load. Cross-flow is illustrated in FIG. 3. In the embodiment of FIG. 3 grid power flows from the point of connection of the grid power line for unit 1 and the solar power line for unit 1, towards the distribution board. The grid power flows along solar power line, across the distribution board in the control system and along the power supply line for unit 4 into unit 4. Cross flow is undesirable for a number of reasons.

In many jurisdictions it is illegal to draw grid power from one unit to another. Also, cross flow can be a safety risk.

Embodiments of the invention are configured to prevent cross flow by controlling the state of relays in the solar power supply lines or in the control system when cross flow is detected or anticipated to disconnect the solar power circuitry from units.

In embodiments, the system detects cross-flow between units by calculating power factor between the AC current and AC voltage on a solar power supply line. The power factor is measured as per the IEC sign convention. In normal operation, with solar generated power flowing from the distribution board in the control unit to the unit, the power factor of the unit's solar supply is greater than 0 (i.e. positive). However, in certain conditions, power may flow from the unit towards the distribution board, through the distribution board and onto a solar power supply line for a different unit. The outcome is that power from one unit flows to another unit. This is flow of power is cross flow. In cross flow situations, the power factor of the solar power supply line is negative.

Solar consumption sensors 281-286 monitor AC current and AC voltage on power supply lines to each of the units. The AC measurements from solar consumption units are provided to control board 240 continuously. For each power supply line AC current values and AC voltage values are provided to control board 240. Control board uses the AC voltage measurement and AC current measurements to calculate the power factor of each unit's solar supply. If the power factor approaches zero it indicates a risk of cross flow of power occurring. On detecting cross flow risk on a solar power supply line the control board opens the solar relay associated with the relevant unit to disconnect the unit from the solar generator. For example, for UNIT 1, if control board 240 calculates that the power factor from solar consumption sensor 281 is less than 0.5 it opens solar relay 231 to disconnect UNIT 1 from solar power generator 160. In different embodiments different thresholds may be used.

In an exemplary embodiment the control board monitors the AC voltage and AC current measurements over 200 ms time periods. If the power factor approaches zero during the time period, the relay is opened. In further embodiments the time period may vary.

Control board 140 monitors AC currents and AC voltages independently for multiple solar power supply lines simultaneously. If cross flow is identified on a particular solar power supply line, the relevant relay is opened and remaining relays are maintained in their current state. Solar relays for multiple units may be opened simultaneously resulting in multiple units being disconnected from solar power supply 170 at the same time.

Embodiments of the system monitor power factor of power on each solar power supply line continuously at 200 ms intervals. This measurement period ensures that any power supply line exhibiting cross flow is switched off within 200 ms of detecting cross flow risk. Further embodiments may monitor power factor at different time intervals and use different thresholds to constitute a cross flow risk event.

One factor which can result in cross flow is large differences in power demand by different units connected to the solar distribution board. In situations when a first unit has a much greater power demand than a second unit, power tends to flow from the second unit to the first unit. The power can flow from the second unit through the solar power supply line, through the distribution board and onto the solar power supply line for the first unit to be provided to the first unit.

The microcontroller may be further configured with a cross flow prevention algorithm to dynamically prevent cross flow of grid power between the units. The cross flow prevention algorithm may pre-emptively identify cross flow of power based on the relative values of the total power demand of each unit.

An example of a cross flow prevention algorithm is now described with reference to FIG. 5 and with respect to the Red phase units of FIGS. 1 and 2. At 810, for each unit independently the controller calculates the total power demand for the unit. The controller receives the power demand for each unit from the AC current and AC voltage measurements provided by the sensors. Grid consumption CTs 251 to 255 provide the current and voltage measurements provided to each unit from the grid at 812, and sensors 261 to 265 provide the current and voltage measurements provided to each unit from the solar power generator at 814. The controller calculates the total power demand for each unit at 816 from the sum of the grid power consumption and the solar power consumption.

At 820 the power demand for each unit is retrieved. At 830 the power demand for each unit is compared and the units are sorted in order of power demand. The controller calculates if any unit has a power demand of less than 20% of the power demand of the highest unit (or any other unit) at 840. For any unit having a power demand of less than 20% of the maximum power demand the controller identifies a potential cross flow event and isolates the unit with the low power demand from the solar power generator by deenergising the relay connecting its solar power supply line to the distribution board at 850.

Any units having power demands higher than 20% of the maximum unit remain closed at 860. Any units previously opened during the previous measurement cycle are also reclosed at 860.

Based on the pre-emptive identification of cross flow by the cross flow prevention algorithm, the controller is configured to selectively and individually control the relays to isolate some or all of the units from the solar power generator to thereby prevent the cross flow of solar power between the units.

The controller measures power demand for each unit over continuous 200 ms cycles. The process described in FIG. 5 is repeated at the end of every 200 ms cycle such that a determination of whether a potential cross flow event is present is made every 200 ms. This results in relays being opened within 200 ms of identification of a potential cross-flow event.

Figure 5:
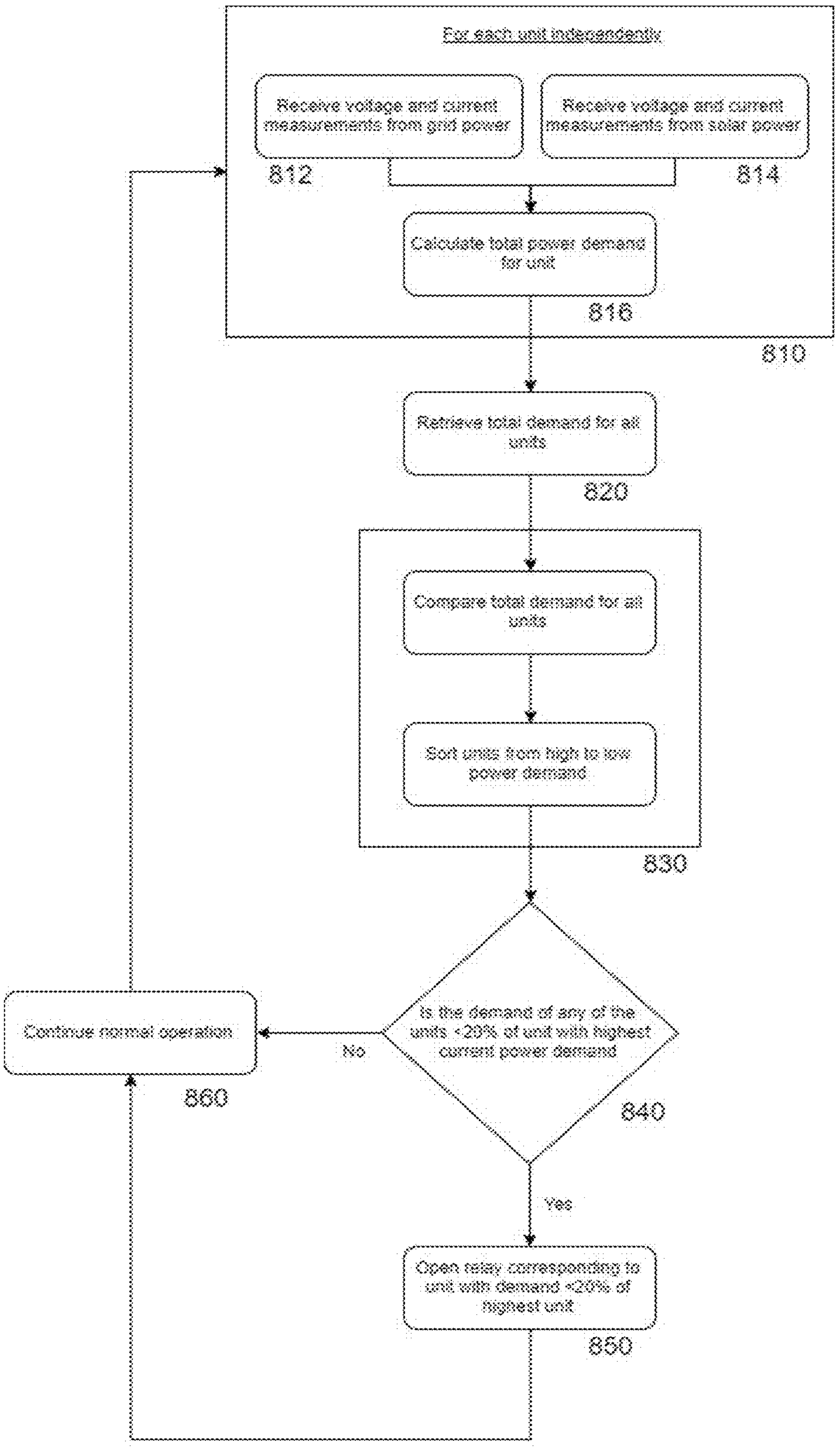
FIG. 5 is a flow diagram showing implementation of a cross flow prevention algorithm.

As described in FIG. 5, if no potential cross flow event is detected, no relays are opened. If a potential cross flow event is detected the controller opens relays associated with units having low power demand. Power demand within units can change quickly and so power requirements are reassessed after every 200 ms cycle. When a relay is opened, it remains opened for the next 200 ms cycle. After the 200 ms cycle, it is closed again.

This cross-flow prevention algorithm is now illustrated with respect to the examples of Table 1.

TABLE 1

| Total power demand by units over time | | | | | |
|---|---|---|---|---|---|
| Unit Number | 0-200 ms (Cycle 1) | 200-400 ms (Cycle 2) | 400-600 ms (Cycle 3) | 600-800 ms (Cycle 4) | 800-1000 ms (Cycle 5) |
| 1 | 70 | 70 | 50 | 20 | X |
| 2 | 70 | 70 | 80 | 90 | 100 |
| 3 | 100 | 90 | 70 | 120 | 110 |
| 4 | 45 | 50 | 50 | 22 | X |
| 5 | 10 | X | 20 | 20 | X |

Table 1 shows the power demand of five units in a solar distribution system during a one second time period (i.e. 5 cycles of 200 ms each). The power demand of each unit is shown for each 200 ms cycle.

During the first 200 ms all relays are closed and all units are connected to the solar generator. The unit with the highest power demand is UNIT 3 (100 W). UNITS 1, 2, 4 have lower power demands than UNIT 3 but power demands above the 20% threshold (i.e. 20 W). UNIT 5 has a low power demand of 10 W, being below the 20% threshold. At the end of the first 200 ms cycle, the relay for UNIT 6 is opened and UNIT 6 is disconnected from the solar generator for the subsequent 200 ms cycle.

In the second 200 ms time cycle UNITS 1, 2, 3, 4 are connected to the solar generator. UNIT 5 is disconnected. The unit with the highest power demand during the second 200 ms cycle is UNIT 3 (90 W). UNITS 1, 2, 4 have lower power demands than UNIT 3 but power demands above the 20% threshold (i.e. 18 W). At the end of the second 200 ms cycle, no UNITS are disconnected and the relay for UNIT 5 is re-closed to re-connect UNIT 5 to the solar generator.

During the third 200 ms all relays are closed and all units are connected to the solar generator. The unit with the highest power demand is UNIT 2 (80 W). UNITS 1, 3, 4, 5 have lower power demands than UNIT 2 but power demands above the 20% threshold (i.e. 16 W). At the end of the third 200 ms cycle, all relays are closed for the subsequent 200 ms cycle.

During the fourth 200 ms all relays are closed and all units are connected to the solar generator. The unit with the highest power demand is UNIT 3 (120 W). UNIT 2 has lower power demands than UNIT 3 but above the 20% threshold of 120 W. UNITs 1, 4, 5 have power demands below the 20% threshold (24 W). At the end of the fourth 200 ms cycle, the relays for UNITs 1, 4, 5 are opened to disconnect those units from the solar generator for the subsequent 200 ms cycle to avoid cross flow.

During the first 200 ms only the relays of UNITs 2, 3 are closed and connected to the solar generator. The unit with the highest power demand is UNIT 3 (110 W). UNITs 2 has lower power demands than UNIT 3 but above the 20% threshold (i.e. 22 W). At the end of the fifth 200 ms cycle all relays are re-closed and all units are connected to the solar generator for the subsequent 200 ms cycle.

As discussed above with respect to the exemplary power demands of Table 1, controller calculates the power demand for each unit every 200 ms and connects or disconnects units based on the relative power demands. The controller receives signals from sensors continuously but conducts measurements every 200 ms based on signals received during the previous 200 ms period.

The duration of the time cycle being 200 ms and the relative percentages being 20% are for illustrative purposes and further embodiments of the invention may use different values without deviating from the invention.

Embodiments of the system may provide fail-safe protection functionality which prevents any cross flow of power between units when no solar power is being generated. All but one of the units may be isolated, so that the single unit that is not isolated may maintain contact between the grid-tied inverter and the electric power grid, thereby avoiding shutdown of the grid-tied inverter due to anti-islanding.

The microcontroller may be further configured with a solar power distribution algorithm to selectively and individually control the relays to dynamically distribute solar power from the solar power generator between the units. based on the relative values of the power demand and the solar power consumption of the units to thereby maximise solar power consumption by the units. In other words, the solar power distribution algorithm may be used to configure the microcontroller to control distribution of solar power by switching the relays on or off to controllably distribute solar power between units. This may minimise export of solar power to the electric power grid and thereby maximise efficacy of solar energy consumption by the units, where efficacy of solar energy consumption may be defined as:

$$\text{Efficacy} = 1 - \frac{\text{actual export} - \text{theoretical minimum export}}{\text{solar generation}}$$

Where "solar generation" is the total solar power generated by the solar generator 160 and delivered to distribution board 245;

"Actual export" is the total solar power not used by the units and exported to the grid;

"Theoretical minimum export" is the total solar power not used assuming that solar power only was used to meet full power demand of the units.

In systems connected to solar power, it is generally preferable to use solar power in preference to grid power where possible. In other words, the greater the efficacy, the higher proportion of solar power that is consumed within the multi-unit building, instead of being exported to the electric power grid.

An example solar power distribution algorithm used by the microcontroller is illustrated in FIG. 5 where "total solar" corresponds to measured solar power consumption, and "total load" corresponds to measured power demands, of the units.

Other examples of the solar power distribution algorithm may take account of other factors or parameters to dynamically distribute solar power from the solar power generator to the units. For example, the solar power distribution algorithm may use instantaneous measurements of solar power generation by the solar power generator and solar power consumption by the units to optimise switching states for an intended outcome. This outcome may be to maximise efficacy of solar consumption within the multi-unit building.

Figure 6:
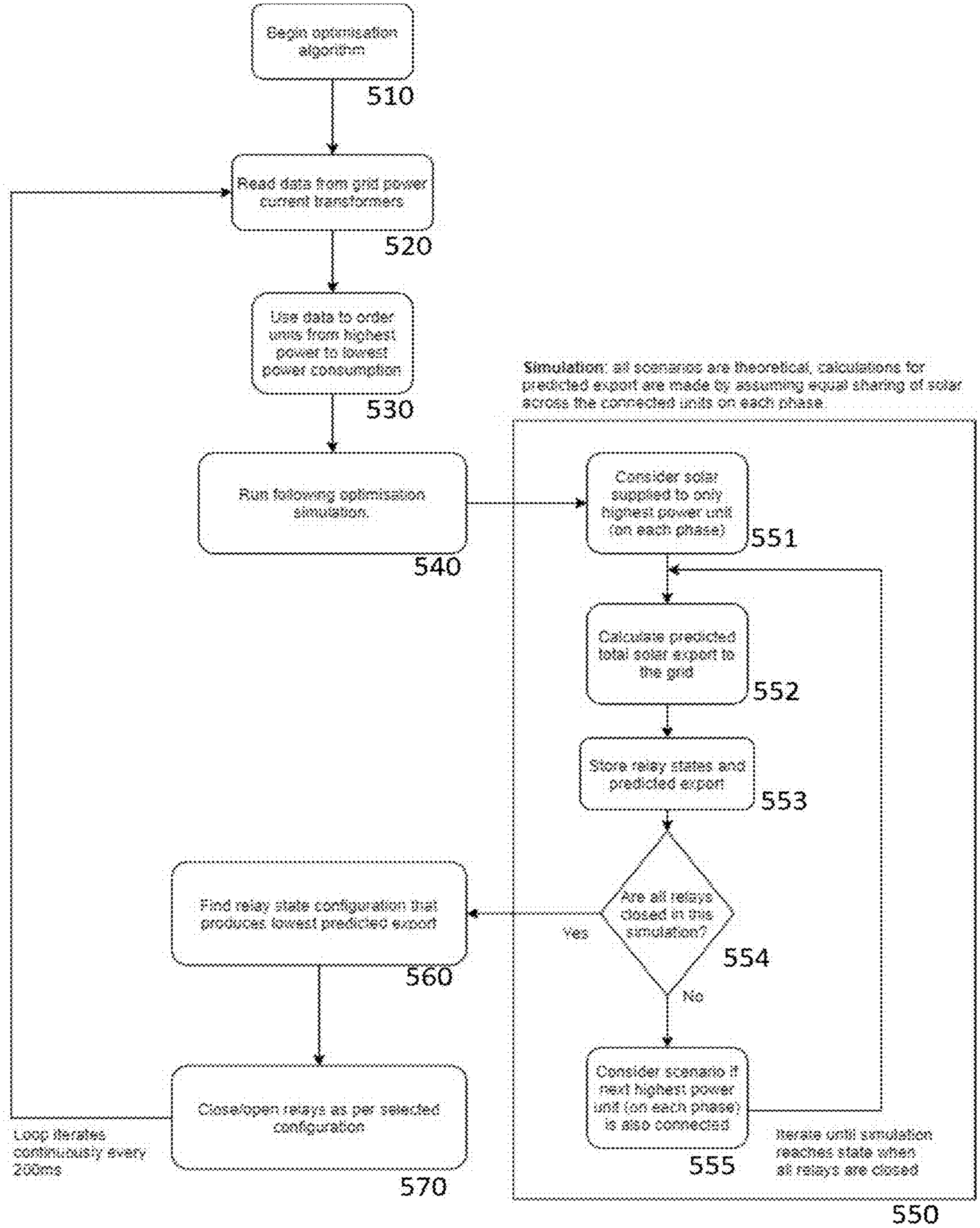
FIG. 6 is an example solar power distribution algorithm.

The solar power distribution algorithm of FIG. 6 is now described. The following description of the algorithm, measurements, power demands and relays relates to units provided with power on the same phase (either Red, Blue, White). Separate algorithms are run simultaneously for each phase and optimised switching states are determined for units on each phase simultaneously and independently. In a system providing power at three phases, three separate algorithms are run each determining the most efficient connection combination for units provided with power on each phase.

In the example of FIG. 6 the solar power distribution algorithm assumes even distribution of solar power across all connected units. For example, if one unit is connected to the solar distribution board, 100% of the solar power is distributed to that unit; if 2 units are connected to the solar distribution board, half the solar power is distributed to each unit; if five units are connected to the solar distribution board, one fifth of the total solar power is distributed to each unit. This may represent a simplification of the dynamic, organic power distribution behaviour in order to minimise complexity of the algorithm. Other examples of the solar power distribution algorithm may therefore more closely model the dynamic, organic distribution of solar power, and to improve accuracy and speed. This may include, for example, peak detection, machine learning and numerical optimisation techniques. The type of relays used in the system can impact the accuracy of the even distribution assumption. Back to back MOSFET relays, described in detail below, provide good reliability for even power distribution.

In the system incorporating algorithm of FIG. 6, the sensors 261 to 265 are configured to provide AC voltage measurements and AC current measurements from solar power supply lines (in relation to solar power) to microcontroller continuously and the sensors 251-252 are configured to provide AC voltage and AC current measurements from grid supply lines (in relation to grid power) to microcontroller continuously. Measurements from sensors may be provided across wired connections or via wireless communication networks. Microcontroller runs the algorithm at a predefined time period and reconfigures the state of relays 231-235 by closing, re-closing or opening the relays depending on requirements each time it runs the algorithm. In the example described in relation to FIG. 6, the algorithm is run at high frequency, every 200 ms. Typically, the higher the frequency of calculation and reconfiguration of relays, the higher the efficacy of the system, since the system can react to changes in load conditions for the units sooner.

The frequency at which the algorithm can be run and the relays re-configured can be limited by a number of factors, including the processing speed of the microcontroller, a zero cross switching requirement, or the switching speed of the relays. MOSFET based relays configured for use in such high frequency switching systems for even current distribution are discussed in detail below.

The system will only close more than one relay on each phase if it detects solar output from the inverter. This is to prevent crossflow between connected units. One must be closed on each phase at any point in time to ensure the inverter maintains grid connection, even if there is no solar output. As soon as the system detects solar output above a predefined threshold, it begins running its distribution algorithm at 510. This distribution algorithm may be the optimisation algorithm.

At 520, for each unit independently, the controller calculates the total power demand for the unit (P_x_load, where x is the unit number). The controller receives for each unit the AC current and AC voltage measurements provided by the sensors. Grid consumption CTs 251 to 255 provide the current and voltage measurements provided to each unit from the grid, and sensors 261 to 265 provide the current and voltage measurements provided to each unit from the solar power generator. The controller calculates the total grid power demand of each unit from the grid measurements, and the total solar power demand of each unit from the solar measurements, using P=IV where P is power, I is current and V is voltage. The controller calculates the total power demand for each unit (P_x_load) from the sum of the grid power consumption and the solar power consumption.

At 530 the power demand (P_x_load) for each unit is compared and the units are sorted in order of power demand.

The optimisation simulation is run at 540. The simulation scenarios are theoretical calculations for predicted export of solar power and are made by assuming equal sharing of solar power across the connected units on each phase.

The controller makes a number of calculations, including:

total solar power generated from the sum of total solar power demand for all units Σ{P_x_solar};

total load from the sum of total loads for all units Σ(P_x_load).

The controller also determines various configurations and combinations or relay states, for each combination it identifies which relays are closed and which units are connected.

At 540 the microcontroller runs a theoretical algorithm to calculate the theoretical export of solar power to the grid for the different hypothetical configurations of relays resulting in different unit connections to the solar distribution board. The algorithm assumes that power demand by a unit is met first by solar power in preference to grid supplied power, and that solar power is distributed evenly among all connected units.

The algorithm calculates, for each phase independently, theoretical export of solar power for different connection combinations according to the following steps 550:

At 551 the microcontroller identifies the highest power unit and assumes that solar is provided to that single unit only. In this scenario, the solar relay for the highest power unit is closed and the relays for all other relays are open.

At 552, the microcontroller calculates the predicted total solar export to the grid in this hypothetical scenario. The calculations may be performed using the following steps for each connected unit:

Step 1: Determine the total power demand for the unit (P_x_load);

Step 2: Determine solar delivered to the unit (P_x_solar) from Σ{P_x_solar}/no. of connected units;

Step 3: Calculate export solar power for unit (e_x) from (P_x_solar)−(P_x_load);

Step 4: Calculate total exported solar power for the hypothetical combination from the sum of solar exports for all connected units: Σ(e_x).

At 553 the relay states and predicted export of solar power is stored in memory (not shown in FIG. 4). In exemplary embodiments microcontroller can write to memory and read from memory.

At 554 the microcontroller determines whether all relays were closed in the simulation. If not, the relay identifies the next highest power unit and re-runs the calculation assuming that the next highest power relay is also connected at 555.

The simulation is run until it reaches a state when all relays are closed. When the simulation has been run in which all relays are closed at 554, the microcontroller compares the predicted solar power exported for all combinations at 560 to identify the combination of relay states that produces the lowest predicted export.

At 570, microcontroller instructs the relay drivers to implement the open/closed relay configuration relating to the optimised state of minimum solar power export.

The efficacy of any combination of relay states is defined by the total solar that would have been exported for that combination of relays in the hypothetical situation in which all solar is consumed (total solar-total load) compared with total exports.

As discussed above, preferred embodiments calculate efficacy for combinations which successively connect units based on total load of the units. For example, the algorithm first calculates efficiency of a combination in which the unit with the highest load is connected only. The algorithm then calculates efficacy of a combination in which the units with the highest and second highest loads are connected only. Thirdly the algorithm calculates the efficacy of a combination in which the units with the highest, second highest and third highest are connected only, and so on.

The controller runs the algorithm and completes the switching combination every 200 ms. Such high frequency assessment of power requirements and usage and switching enables the system to respond to changes in load requirements within 200 ms to connect units to the solar distribution board to optimise use of solar power.

As discussed above, cross flow of power within the solar distribution system is undesirable. Further embodiments incorporate cross flow prevention algorithms into the optimisation algorithm when determining which units to connect. As described above, cross flow prevention is implemented by calculating the total load for each unit independently and de-energising relays for units with a total load of less than 20% of the load of the unit having the highest load demands.

Systems run the cross flow prevention algorithms in parallel with the export optimisation algorithms, typically over the same time cycle. In such cases, when the microcontroller identifies a cross flow risk, for example by detecting a power factor approaching zero or by identifying a load for a unit being significantly greater than the load of a different unit, the optimisation algorithm prioritises cross flow protection above efficacy in order to protect the system. In such cases, the units at risk from cross-flow are disconnected and are not considered for connection in iterations of efficacy iterations at 550.

An advantageous feature of the grid-tied inverter is its anti-islanding function. This acts by shutting down the inverter when the inverter cannot sense the grid. The intention of this is to prevent the inverter from delivering solar power to the grid in the case of a power outage. Without this function, utility workers may unknowingly be exposed to live voltages while performing maintenance on the grid. The system ensures that the inverter remains online while preventing cross-flow of power between units through the protection measures described above.

If an individual unit loses connection to the grid, the inverter may still have grid connection through other units that may be connected and hence will not shut down. In this scenario the system may have the functionality to disconnect the solar power connection to the unit without grid connection. The intention of this is to prevent solar feed into a unit with no grid connection, resulting in a potential safety issue.

In addition, the cross flow prevention algorithm may configure the at least one controller to isolate all units from the solar power generator when reverse power flow from the units back to the solar power distribution panel is detected, and this power exceeds the expected power consumption of the system. This may shut down the inverter and trigger notification of a potential fault event.

As discussed above, embodiments of the solar power distribution algorithm may assume uniform distribution of solar power when all units are connected.

For example, as switching frequency of the switches increases, the performance of the solar power distribution algorithm and/or the cross-flow prevention algorithm may be improved. The use of fast switching techniques where the SSRs are able to switch at a frequency of up to 100 Hz may improve the speed of the system. In this example, switching may be carried out at the zero crossing of each cycle or half-cycle. This may allow for finer modulation of average solar power delivered to units over a specific time interval.

In preferred embodiments, the system may further comprises billing meters configured to measure the solar power delivered to each tenant ($d_n$), and the total power consumed by all participating tenants (C). The meters preferably comprise National Measurement Institute Pattern Approved, or ANSIC12.20.2015 Revenue Grade meters. The amount of solar power consumed by each unit may then be computed from measurements obtained from the billing meters, so that each unit may be billed only for the solar power actually consumed (which may be less than the solar power delivered to the unit). Specifically, the solar power consumed by each tenant ($s_n$) may be calculated as:

$$s_n = \frac{d_n}{D} \times C, \text{ where } C < D, \text{ or}$$

$$s_n = d_n, \text{ where } C > D.$$

In preferred embodiments, the billing meters communicate the measurements and/or computed consumption to a monitoring and billing portal (not shown), via any suitable wired or wireless transmission method. Alternatively, the portal system may comprise a processor for computing consumption of each tenant ($s_n$) from the measurements received. The portal may be accessed via user devices so that the tenants may view the performance of the shared solar asset, pay their bills, view financial and environmental savings resulting from the solar system, and combinations thereof. If the switches are opened, no solar power will be delivered to the units and the billing meters will detect this accordingly.

Embodiments of the system may also provide demand management, for example, remote control of specific loads (eg, electric water heaters and other high-powered equipment) during times of excess solar generation. Control mechanisms may include wireless protocols or power line communications.

Embodiments of the system may also provide a control algorithm to allow for “peak shaving” or the diversion of solar energy to a particular consumer in order to reduce peak demand for the billing period. This may be advantageous where commercial electricity contracts apply a high tariff to peak demand. For example, embodiments of the solar power distribution algorithm may include predictive algorithms and weather forecasting to control the switches.

Other embodiments of the system may also provide a solar power export algorithm to maximise export to the grid through one or more selected units during times when the electric power grid has limited generation capacity. This may be applied in specific contracts with electricity retailers, and may include external communications or an electronic data interface to the electricity retailer’s control systems.

Further embodiments may be further provided with wireless communications capabilities and may be configured to allow for remote monitoring of control algorithm outputs, including but not limited to remote monitoring of switching states of the switches and energy measurement data. This may allow integration of the two metering modules into a single metering module with 3G/4G capability (or equivalent communications protocol). Where remote monitoring is implemented, two-way communications may be added to enable an administrator of the system to remotely connect and disconnect residents to solar as per contractual requirements.

The system may be configured to interface with energy storage devices which are both AC and DC powered. This may allow for the system to optimise the usage of the energy storage system, permitting a larger solar system to be installed without more export from the multi-unit building occurring. For example, the system may be configured to be compatible with batteries. This may include AC-coupled and DC-coupled battery systems, as well as systems capable of supplying backup power in the event of grid failure. This may require interfacing with hybrid inverter systems.

To increase installation flexibility, the system may be implemented using a split metering structure as described above. This may involve a separate metering module to be installed inside the main switchboard. This may monitor the individual consumption of each unit using CTs, wired to a metering module located in the main switchboard. This may then communicate to the main control board via a serial communication or via a wireless communication protocol. This implementation of the system 10 may be intended to avoid long CT cable runs between the main control module and the main switchboard.

Other embodiments of the system may use automatic transfer switches (ATS) on the PCB to allow disconnection of the entirety, or parts of, the system from the grid. This may facilitate zero export of solar energy to the grid, or emergency backup battery power solutions for the multi-unit building. This configuration may not require the solar power distribution algorithm described above as power would flow naturally to the units or loads that require it.

Various types of switches and relays may be used in the system, in particular for solar relays positioned at the solar distribution boards which are switched at high frequency to optimise consumption of solar power, as discussed above. In some embodiments, solar switches are mechanical switches. Mechanical switches are effective for evenly distributed AC current sharing. Mechanical switches are also effective at high switching frequency. However, the moving parts within mechanical switches can deteriorate over time resulting in limited lifetimes. Mechanical switches are typically only operational within limited power ranges.

Preferably, the switches 231 to 236 used to control the distribution of solar among the units may consist of solid state relays. These solid state relays may be Insulated-Gate Bipolar Transistor (IGBT) or MOSFET based.

Figure 7:
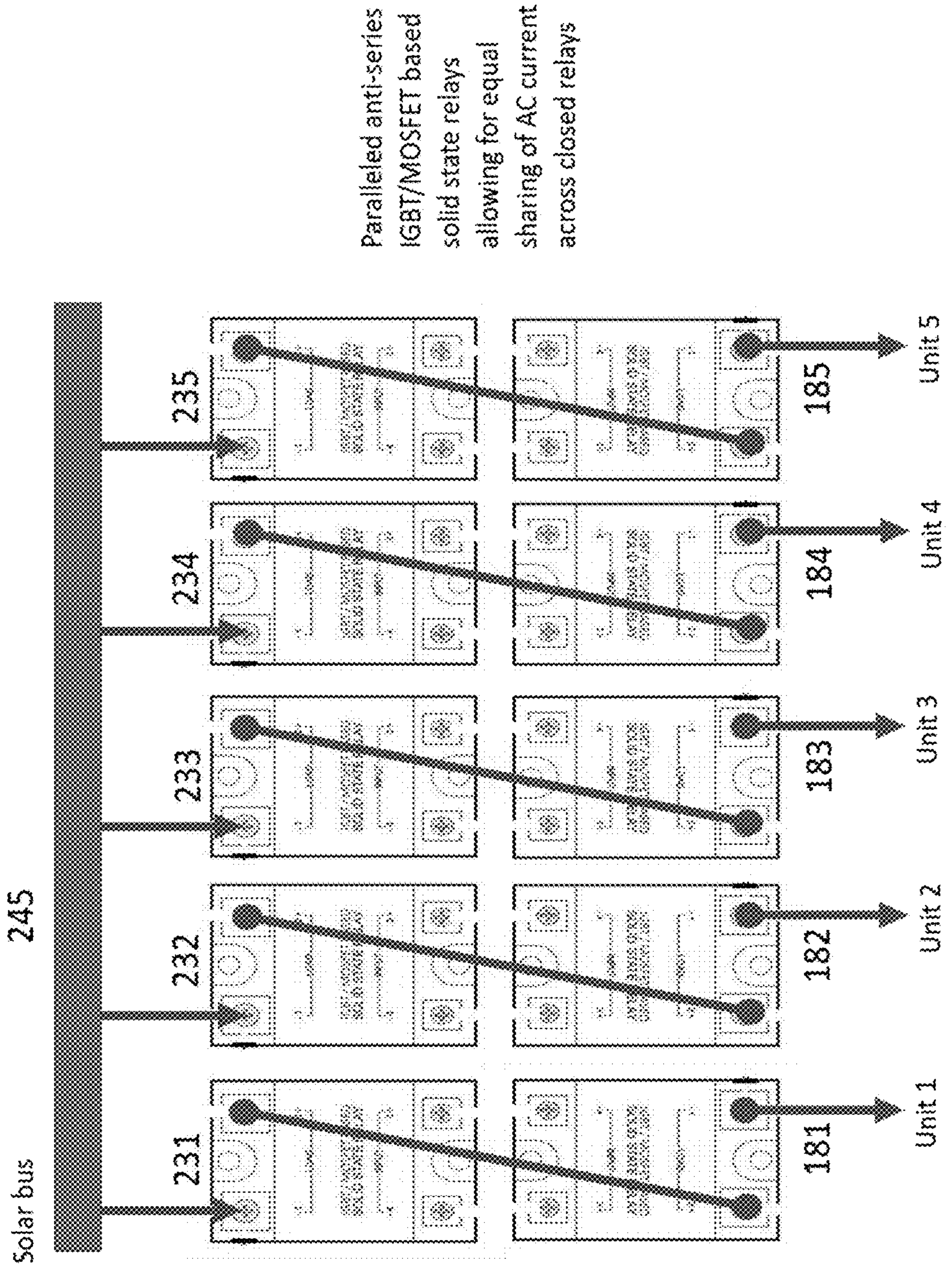
FIG. 7 shows IGBT or MOSFET based relays in an example embodiment.

IGBT or MOSFET based relays may be wired with their load side terminals back to back, or in anti-series, allowing them to effectively control power in AC scenarios. FIG. 7 shows an illustrated example of IGBT/MOSFET based solid state relays having load side terminals connected, and uses the same numerical labelling as FIGS. 1 and 2. In FIG. 6 solar distribution board 235 is connected to all relays 231 232 233 234 235 236, each relay being connected to a unit.

The use of IGBT or MOSFET based relays is beneficial since it allows for a predictable and equal current sharing behaviour of closed relays in parallel. This allows the controller to effectively simulate the distribution of solar power, allowing for an accurate optimised control algorithm. Further benefits of IGBT or MOSFET based relays are that they are responsive to operate at high frequencies and can have extended switching lifetimes compared with mechanical switches.

Embodiments of the present invention provide behind-the-meter systems that are both generally and specifically useful for dynamically distributing solar power to units in multi-unit building, and for dynamically preventing cross flow of solar power between the units.

Embodiments of the invention allow solar distribution systems for sharing solar power between residents in a multi-metered building to be installed without any change required to standard grid power infrastructure, including existing metering infrastructure. Embodiments of the invention are suitable for distributing solar energy to all different building types, including apartment buildings, office blocks and retail centres.

Embodiments of the invention constantly monitor energy usage and dynamically adapt the distribution of solar power in a way to optimise consumption of solar power or satisfy another pre-determined outcome. Embodiments share solar electricity among units operating on the same phase.

More generally, embodiments of the invention provide a behind the meter system suitable for controlled distribution of AC power between multiple units or other load bearing systems. In the examples described above, the control system is used to distribute solar generated power among multiple units. However, in further embodiments the control system can be used to distribute power from any power source among multiple units. The control system is particularly useful when there is a desire to use power from the power source in preference to, for example, power delivered from the grid. Embodiments of the invention are particularly useful when power is provided by a renewable energy source and there is preference to use the power from the renewable energy source rather than metered grid provided power. For example, the control system could be used to distribute power from a wind generated power system or other renewable power source. In such cases, solar power generator 160 is replaced with a different power source, for example a wind power generator. The wind power generator includes an inverter having a three phase AC output for connection on to the distribution boards of the control system.

In the embodiments described above, relays are opened in the event that a risk of cross flow is detected. In embodiments the system may also open relays for other reasons, e.g. for example to increase solar self consumption.

In embodiments the power distribution boards 245 256 247 are distribution busbars.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, namely, to specify the presence of the stated features but not to preclude the presence or addition of further features in various embodiments of the invention.

It is to be understood that the aforegoing description refers merely to preferred embodiments of invention, and that variations and modifications will be possible thereto without departing from the spirit and scope of the invention, the ambit of which is to be determined from the following claims.

The invention claimed is:

1. An AC power distribution system for selectively connecting a first AC power source to a plurality of grid connected loads in a power sharing system comprising:

a power distribution board having:

i. at least one input configured for receiving AC power from a first AC power ii. at least two switches, each switch being configured for connecting and disconnecting the first AC power source to a separate grid connected load in parallel, where each grid connected load is connected to an electric power grid in parallel, and each switch having an OPEN/CLOSED configuration, wherein in the CLOSED configuration the switch is configured to provide power from the first AC power source to a grid connected load, with the grid connected load connected to the first AC power source in addition to the electric power grid, and wherein in the OPEN configuration the switch is configured to disconnect the first AC power source from the grid connected load such that no power from the first AC power source is provided to the grid connected load in addition to the electric power grid;

iii. a controller configured for selectively controlling the OPEN/CLOSED configuration of the switches;

and iv. sensors configured to measure total power from the first AC power source;

V. sensors configured to measure power demand of each grid connected load;

wherein the controller is configured to calculate power exported to the grid for different switch configurations and selectively controls switches to meet preferred power export requirements.

2. A system according to claim 1 where in the first AC power source is a solar power generating system.

3. A system according to claim 1 wherein the first AC power source is an embedded power source configured to be higher voltage than grid power.

4. A system according to claim 1 wherein the switches comprise relays.

5. A system according to claim 1 wherein the switches comprise solid state relays (SSR).

6. A system according to claim 1 wherein the switches comprise parallel sets of two IGBTs or MOSFETs arranged with their load side terminals connected in anti-series.

7. A system according to claim 1 wherein the power distribution board is a distribution busbar.

8. A method for controlling distribution of AC power between loads in a power sharing system using the system of claim 1, comprising:

receiving at the controller measurements from the sensors;

calculating power exported to the grid for different switch configurations;

determining preferred power export requirements and identifying a switch configuration which best matches the preferred power export requirements; and selectively setting the configuration of the switches in accordance with the best match to the preferred export requirements.

9. A method according to claim 8 where in the first AC power source is a solar power generating system.

10. A method according to claim 8 wherein the first AC power source is an embedded power source configured to be higher voltage than grid power.

11. A method according to claim 8 wherein the switches comprise relays.

12. A method according to claim 8 wherein the switches comprise solid state relays (SSR).

13. A method according to claim 8 wherein the switches comprise parallel sets of two IGBTs or MOSFETs arranged with their load side terminals connected in anti-series.

14. A method according to claim 8 wherein the power distribution board is a distribution busbar.

* * * * *